United States Patent [19]

Shefler

[11] Patent Number: 4,815,122
[45] Date of Patent: Mar. 21, 1989

[54] TELEPHONE ANSWERING SYSTEM WITH MEANS FOR RECOVERING OPERATIONAL DATA

[75] Inventor: Gerald E. Shefler, Milwaukie, Oreg.

[73] Assignee: Code-A-Phone Corporation, Clackamas, Oreg.

[21] Appl. No.: 42,159

[22] Filed: Apr. 24, 1987

[51] Int. Cl.⁴ .............................................. H04M 1/64
[52] U.S. Cl. ......................................... 379/67; 379/77
[58] Field of Search ....................... 379/67, 70, 73, 79, 379/80, 82, 77

[56] References Cited

U.S. PATENT DOCUMENTS

| | | | |
|---|---|---|---|
| 3,723,656 | 3/1973 | Curtis et al. | 379/82 |
| 3,728,488 | 4/1973 | Bonsky et al. | 379/81 |
| 3,757,049 | 9/1973 | Bonsky et al. | 379/77 |
| 3,903,369 | 9/1975 | Darwood | 379/77 |
| 3,959,591 | 5/1976 | Darwood | 379/79 |
| 3,979,560 | 9/1976 | Darwood | 379/82 |
| 3,991,274 | 11/1976 | Darwood | 379/77 |
| 4,005,270 | 1/1977 | Darwood | 379/76 |
| 4,319,089 | 3/1982 | Miller | 379/73 |
| 4,400,586 | 8/1983 | Hauscom | 379/77 |
| 4,458,179 | 7/1984 | Bainbridge et al. | 315/88 |
| 4,469,919 | 9/1984 | Nakamura et al. | 379/73 |
| 4,484,036 | 11/1984 | Lyle et al. | 379/351 |
| 4,549,046 | 10/1985 | Mock et al. | 379/77 |
| 4,581,485 | 4/1986 | Bond et al. | 379/76 |
| 4,663,678 | 5/1987 | Blum | 360/72.2 |
| 4,713,835 | 12/1987 | Bond et al. | 379/79 |

Primary Examiner—Thomas W. Brown
Attorney, Agent, or Firm—Bright & Lorig

[57] ABSTRACT

A telephone answering system that includes a system for accurately and rapidly recording one or more copies of all important and necessary operational data onto a message storage means such as a cassette or tape unit that forms part of a telephone answering system. The system also includes a mechanism for recovering the recorded data after power has been restored to the system following interruption of power and loss of the recorded data from the answering system's memory.

12 Claims, 5 Drawing Sheets

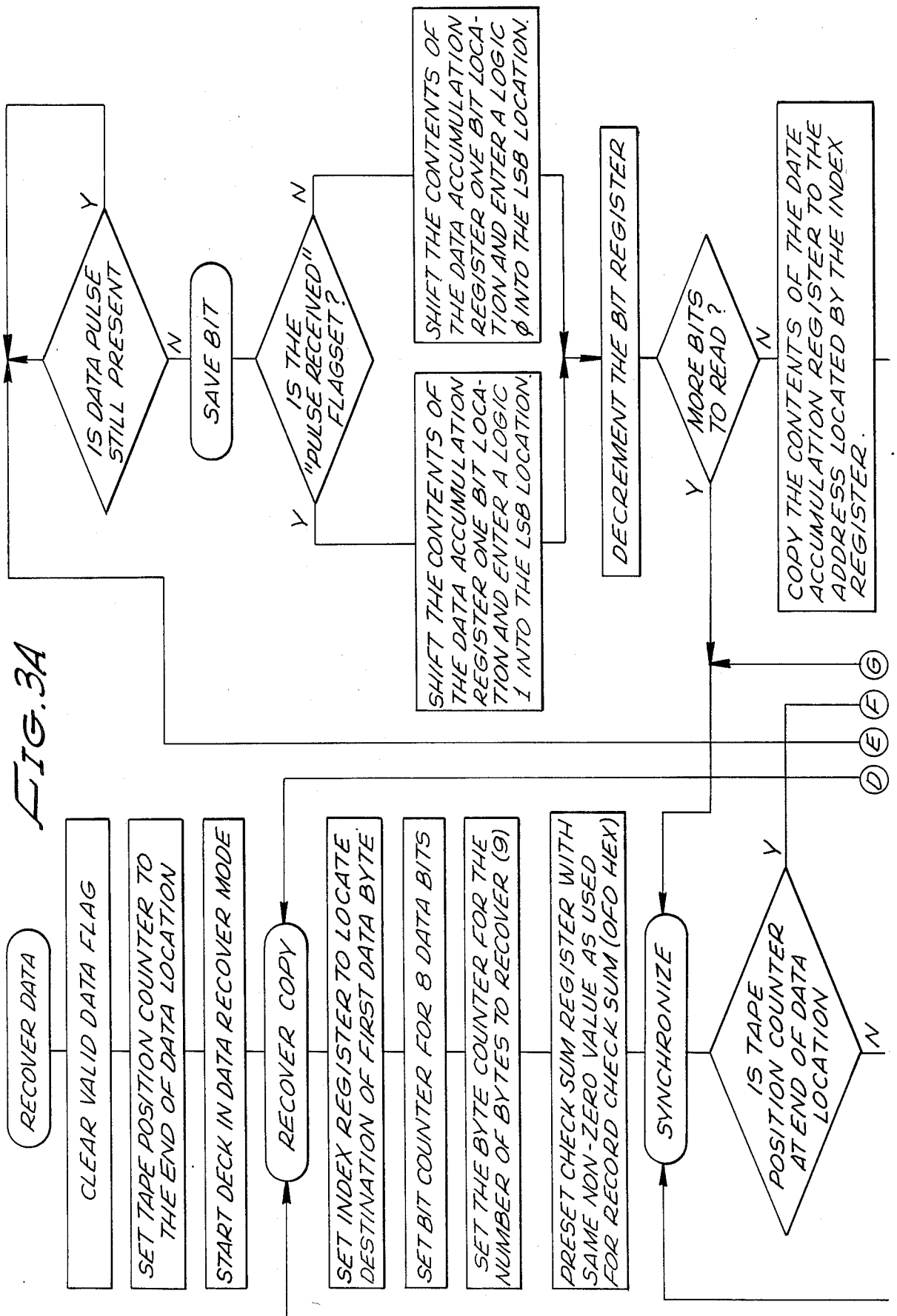

TELEPHONE ANSWERING SYSTEM WITH MEANS FOR RECOVERING OPERATIONAL DATA

BACKGROUND OF THE INVENTION

When a telephone answering system suffers loss or interruption of power, important operational information stored in the form of data in electronic circuits, microprocessors, or random access memories is often also lost. When power is restored, important messages, message counts, and message locations are lost, and the system may malfunction or become inoperative. This is particularly troublesome for single tape or single cassette answering machines because several locations on the tape or cassette must be maintained in system memory, including the end of the outgoing message and the beginning and end of incoming messages. Many telephone answering systems ignore these problems. Thus, if a power interruption occurs, this important operational data is lost. Other systems try to solve these problems with costly battery backup systems or non-volatile memory for the electronic circuits, microprocessors or random access memories.

SUMMARY OF THE INVENTION

This invention provides a system, preferably utilizing existing components in a telephone answering system that record the audio of outgoing and incoming messages, to rapidly and accurately record at least one copy of all important and necessary operational data, from microprocessor memory or elsewhere, onto a message storage means such as a cassette or tape.

This invention also provides a system for recovering the recorded data after power has been restored to the system. The recovered data can then be used to restore system memory and maintain proper operation of the answering system without loss of important information or messages. This invention provides full memory backup without adding costly components such as batteries and non-volatile memories.

This invention is useful in telephone answering systems that use at least one magnetic tape as a storage means for an outgoing announcement and that may, but need not include means for recording one or more messages from callers. The invention provides a system for recording certain data on the outgoing message storage means and/or the incoming message storage means. This data can include, but is not limited to data relating to the end of the outgoing message location on the outgoing message storage means, the end of incoming message location on the incoming message storage means, the number of messages recorded or answered by the answering system, the off/on status of the machine, data relating to availability of additional message storage capacity, and data for use in verifying the accuracy of the recorded data. The system also includes means for recovering the data recorded on the storage means for use in restoring important operational data to the system memory which may be lost if the electrical power to the answering machine is interrupted or terminated for any reason.

In preferred embodiments, the telephone answering system includes a single tape storage means for recording an outgoing message, at least one incoming message from a caller to the system, and data intended for recovery and reuse in case electrical power is lost to the system, in front of the outgoing message on the message storage means. The system also includes a means for counting pulses generated by a motion detector for creation of data representing the end location of the outgoing message and the end location of the last incoming message recorded on the storage means.

In preferred embodiments, the system for recording and recovering operational data for the answering system is adapted to record at least one duplicate copy of the data and more preferably, five or more duplicate copies of the data. These duplicate copies assure complete and accurate data recovery for reuse by the answering system if data in the microprocessor memory is lost because of an interruption in power to the answering system. The answering system updates recorded data by rerecording the data at the end of any machine operation in which important operational data in the microprocessor memory changes, such as changes in message count, end of message locations, or machine status.

Preferred embodiments of the recording/recovery system also include means for recording operational data in binary format, in the form of pulses recorded on said storage means in serial fashion. Each recorded data bit is represented by a synchronizing pulse for purposes of timing data recovery, followed within a predetermined time period with a second pulse if the logic state of the data bit is a "one" or the absence of a second pulse if the logic state of the data bit is a "zero." These embodiments facilitate rapid recording and accurate recovery of data with minimal error from tape speed variations.

BRIEF DESCRIPTION OF THE DRAWINGS

This invention can better be understood by reference to the drawings, in which:

FIGS. 3A and 3B comprise a flow diagram of a system for recovering such recorded data for reuse by the answering system.

DESCRIPTION OF THE EMBODIMENTS

Figure 1:
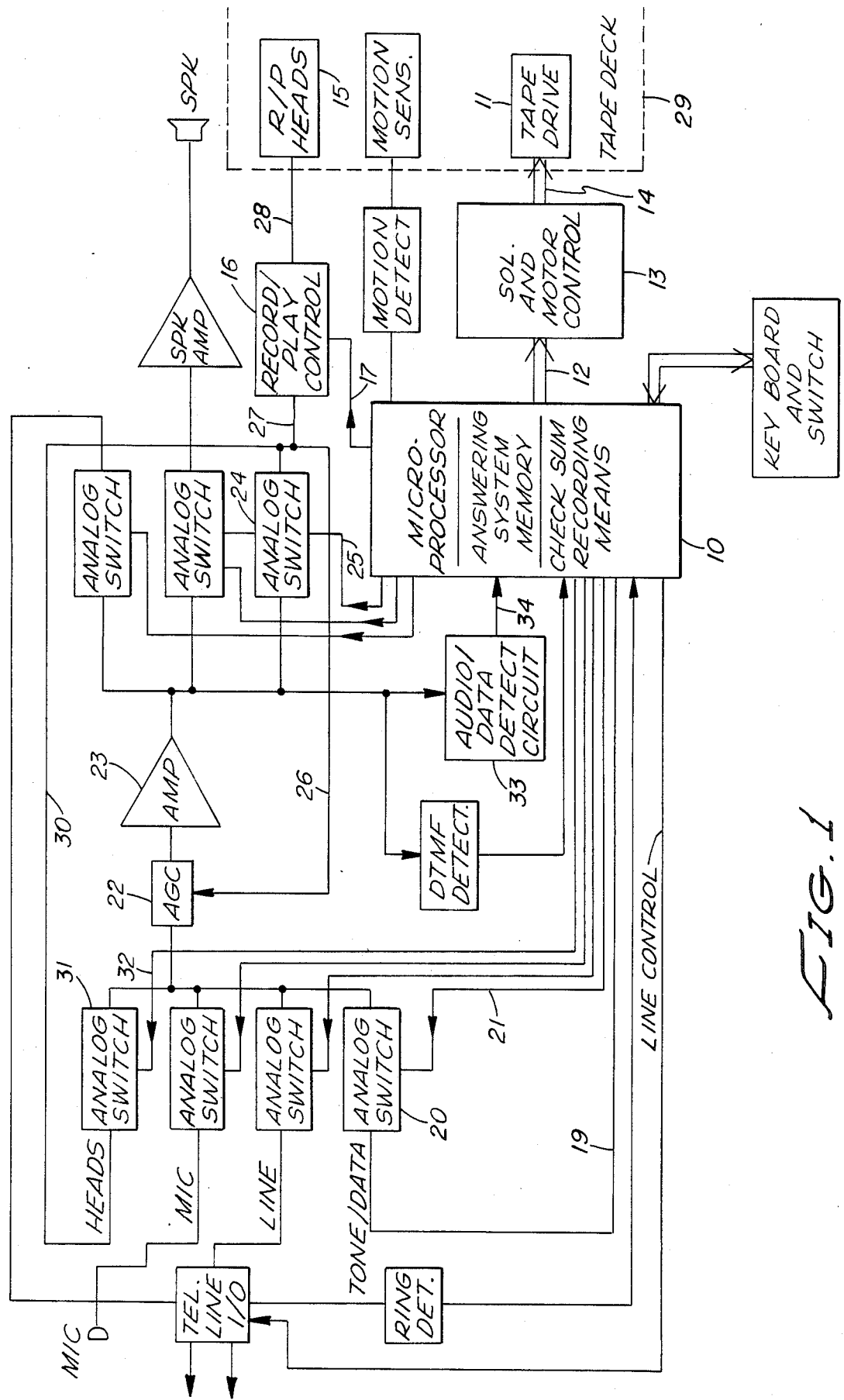
FIG. 1 is a block diagram of a preferred embodiment of a single tape telephone answering system that includes a means for recording and recovering important operational data.

FIG. 1 shows a block diagram for a preferred embodiment of a complete telephone answering system. This system includes means for recording important operational data from microprocessor memory, and means for recovering this data for reuse by the answering system following a power interruption and subsequent power restoration. Data that is important to proper continued operation of the system after an interruption in system power is preferably recorded on the message storage means as a series of audio pulses.

Recording begins when microprocessor 10 starts tape drive 11 in forward mode through path 12, solenoid/motor control 13, and path 14; places the record/play heads 15 in record mode with record/play control 16 through path 17; and enables analog switch 20 through path 21, and analog switch 24 through path 25. The audio pulses representing the data bits are generated and timed by microprocessor 10 by momentarily changing the logic level output line 19 from logic 0 to logic 1 and back to logic 0. The audio pulses pass through analog switch 20, to the automatic gain control 22 which controls the amplitude of the pulses passed to amplifier 23. The output of amplifier 23 passes through analog switch 24 to the automatic gain control 22 on feedback line 26 to adjust the signal amplitude to proper level for recording and through path 27, record/play control 16, and path 28 to the record/play heads 15 for recording on the message tape of tape deck 29.

Figure 2A:
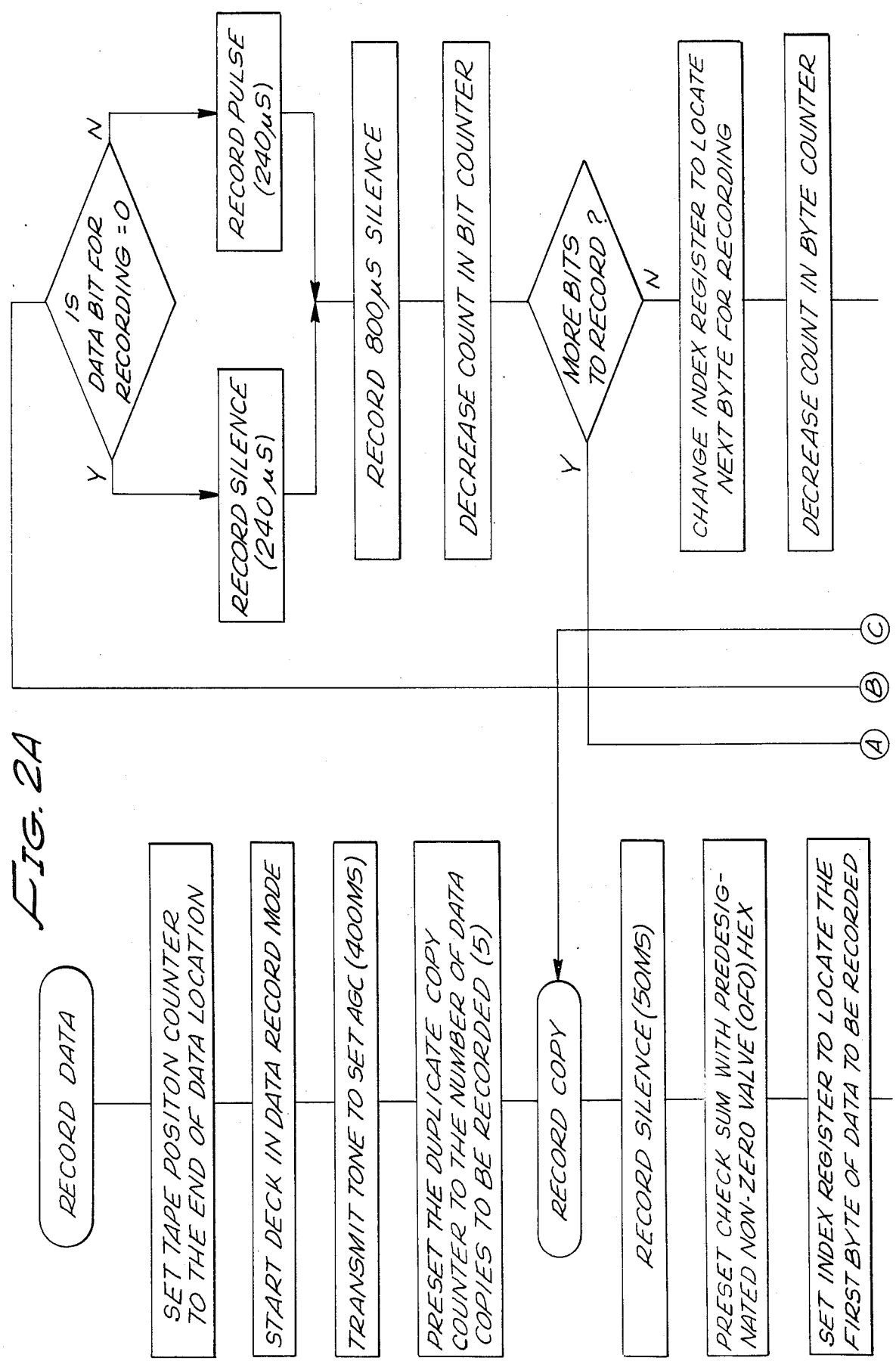
FIGS. 2A and 2B comprise a flow diagram of a preferred embodiment for a system to record such data.
Figure 2B:
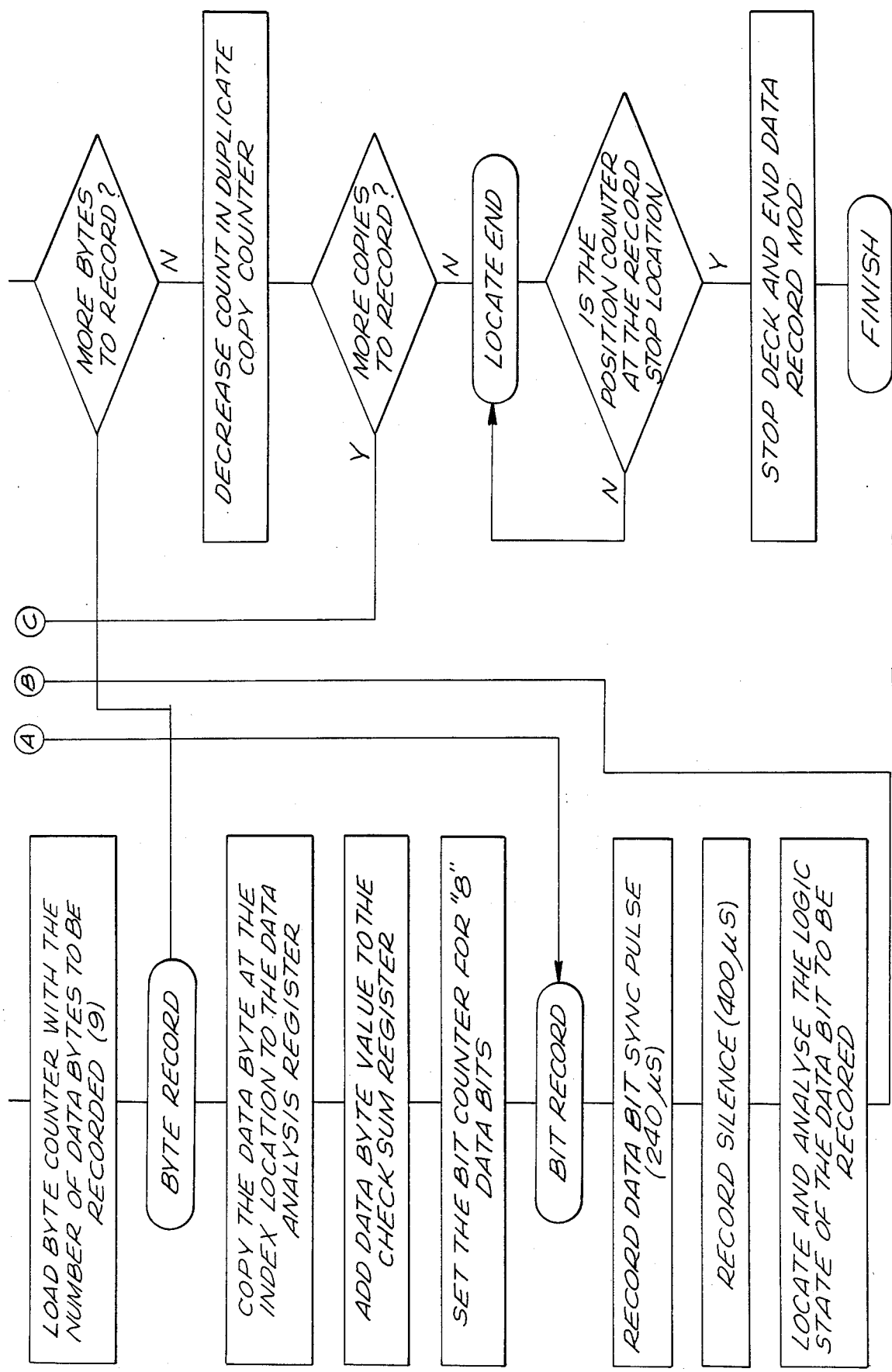

A preferred embodiment for generating, timing and recording the audio pulses representing data bits appears in the flow chart of FIG. 2. Before data recording begins, the tape should be positioned at the location representing the beginning of data, here the beginning of the tape. Thereafter, the system begins the record data routines. The tape position counter is set to signal when the end of data location is reached, i.e., the location on the tape beyond which data is not to be recorded. This position generally coincides with the beginning of the outgoing message position in a single tape answering system. The tape deck is then started in the data-recording mode, and a tone generated by the processor from the tone/data output 19 is recorded at the beginning of the tape. The purpose of this tone is to enable the automatic gain control circuit 22 to adjust the output of the amplifier to the optimum level for recording data pulses on tape before the recording of the data begins. A counter is also preset for the number of duplicate copies to be recorded, here five.

Thereafter, the system begins the record copy routine. In this routine, a predetermined period of silence is recorded, here 50 mS., to serve as a delimiter for, or boundary between each copy of recorded data, a check sum register to accumulate the arithmetic sum of the recorded data is preset with a predesignated non-zero value, here OFO-hex, an internal index register is set to locate the first byte of data to be recorded, and a register is set to count the number of bytes to be recorded, here nine. This register is internal to microprocessor 10.

The microprocessor then begins the byte record routine and copies a duplicate of the data byte located by the index register into a register capable of analyzing the logic state of each individual bit in the byte. The analysis register is hereafter called the data analysis register. This register is internal to microprocessor 10.

The arithmetic value of the byte is added to the existing value in the check sum register, and a bit counter is set to eight which represents the number of bits in the byte to be recorded. Thereafter, the system begins recording data bits. The information representing each data bit is preceded by a synchronizing pulse of predetermined length, here 240 microseconds, followed by 400 microseconds of silence. The microprocessor then analyzes the logic state of the data bit to be recorded, here the least significant bit in the data analysis register. If the data bit under analysis represents a logic one, the system records another pulse of 240 microseconds. If the data bit represents a logic zero, the system continues to record silence during the time period designated for the data bit, here 240 microseconds. The system then records a predetermined period of silence to separate the data information from the next synchronizing pulse, here 800 microseconds.

The system then decreases the contents of the bit counter by one count. If there are more bits to be recorded for the byte of data under analysis, the system repeats this bit record routine until all eight bits in the byte are recorded. The microprocessor then changes the contents of the index register to locate the next byte of data to be recorded, and decreases the contents of the byte counter. This register and this counter are internal to microprocessor 10. If more bytes are to be recorded, the processor repeats the byte record routine until all nine bytes have been recorded. When all nine bytes have been recorded, the microprocessor decreases the contents of the duplicate copy counter, tests to determine if more duplicate copies are to be recorded, and repeats the record copy routine until all five duplicate copies are recorded. Silence is then recorded until the tape reaches the end of data location. At that time, the microprocessor exits the data record routines, stops the tape deck, and disables the recording means.

Figure 3B:
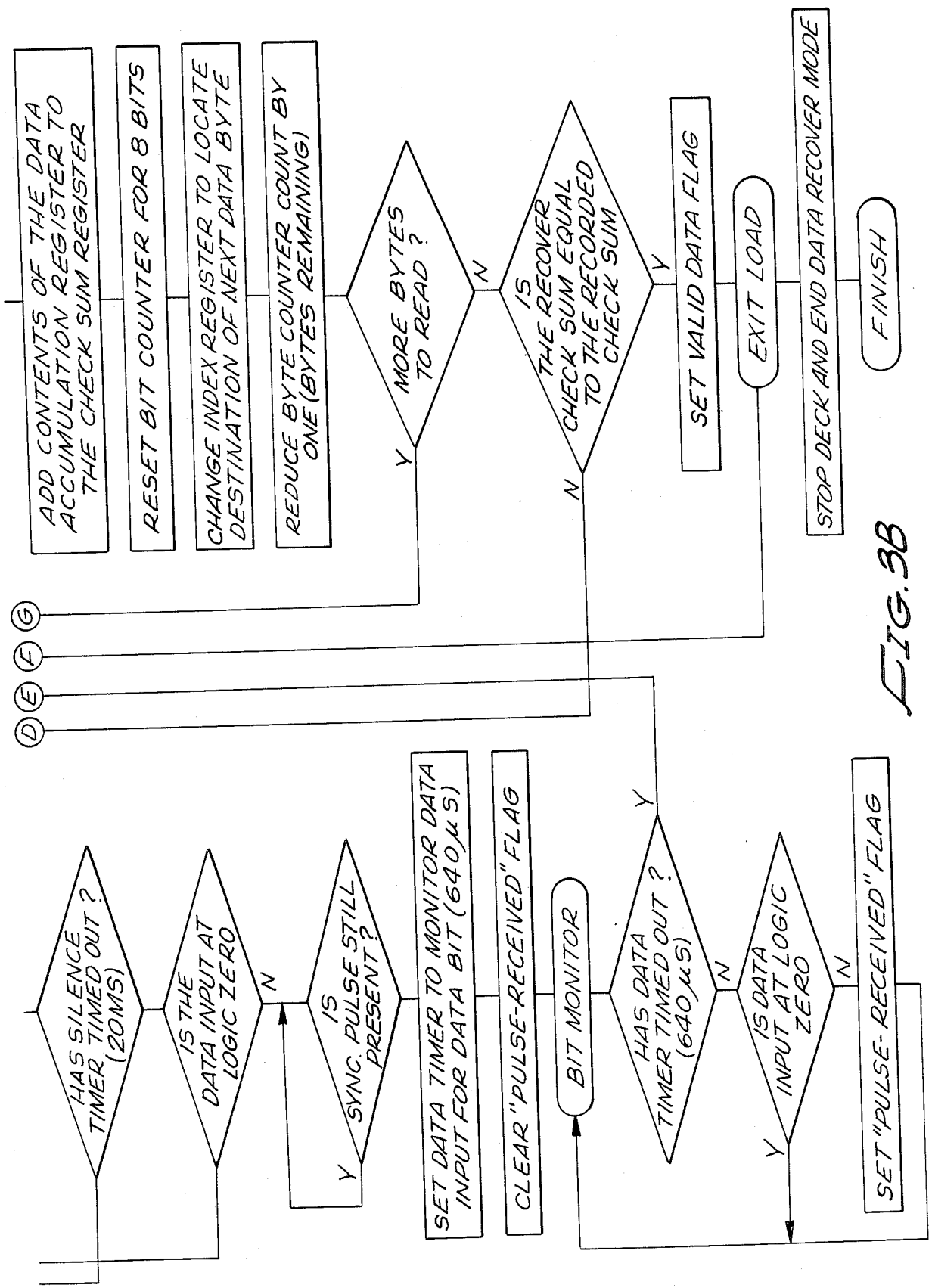

In preferred embodiments, recovery of recorded data takes place only after an interruption of system power in which important operational data in the microprocessor memory has been lost. Before data recovery can begin, the answering system must position the tape at the beginning of the recorded data, here at the beginning of the tape. FIGS. 3A and 3B facilitate understanding the steps for recovering recorded data from the tape. Recovery begins when microprocessor 10 starts tape drive 11 in forward mode through path 12, solenoid and motor control 13, and path 14. Thereafter, analog switch 31 is enabled through path 32 while play mode is enabled with record/play control 16 through path 17. Playback signals representing the recorded data are detected by the record/play heads 15 and pass through record/play control 16, analog switch 31, and automatic gain control 22 and are amplified by amplifier 23. The amplified signals from amplifier 23 are applied to the audio/data detect circuit 33 which is a Schmitt trigger threshold detector that distinguishes between valid signals and background noise. Amplified signals determined valid by the audio/data detect circuit 33 are converted to corresponding logic pulses on the input of microprocessor 10 through path 34. Microprocessor 10 then analyzes these pulses to recover the recorded data and verifies the data for accuracy before restoring the data to memory.

A preferred embodiment for the analysis timing of the audio pulses representing data bits may be understood with the aid of flow chart FIGS. 3A and 3B. To begin data recovery, the microprocessor starts the recover data routine, clears a flag register designated as the valid data flag, and sets the tape position counter to signal when the end of data location is reached, i.e., the location on the tape beyond which data will not be found. This position generally coincides with the beginning of the outgoing message on the tape in a single-tape answering system. The tape deck is then started in the data-recover mode.

Thereafter, the recover copy routine is started. The system sets an internal index register to locate the destination for the first byte of data to be recovered, sets a register to signify the number of bits to be recovered for each byte, here eight, sets a register to count the number of bytes to be recovered, here nine, and presets the check sum register, used to accumulate the arithmetic sum of the recovered data, with the same predesignated non-zero value used to initialize the check sum register before the data was recorded, here OFO-hex.

Using the sychronize routine, the system begins to monitor for signals from the audio/data detect circuit. This synchronize routine is a delay routine used to correct any timing errors between data bits resulting from tape speed variations during recording or recovery of both. During the delay, the system also monitors the tape position counter to determine if the tape has advanced to the end of data position. If so, the system terminates the data-recover routines and stops the tape mechanism. During the delay, the system also monitors a silence timer, here 20 mS, which is used to identify the delimiters for the duplicate copies of data. This timer is internal to microprocessor 10. If the timer detects a silence period greater than 20 mS, data recovery is restarted at the recover copy routine. Once a synchronization pulse is detected by the synchronize routine, and after the pulse has ended, a bit monitor timer is set to time the duration that the system should monitor for the logic state of the following data bit, here 640 microseconds.

The bit monitor routine then monitors the data input for the presence or absence of a second data pulse until the monitor timer signals the end of the monitor period. If a logic one is detected at the data input during said monitor period, a pulse-received flag is set. At the end of the bit monitoring period, and after any data pulse has ended, the save bit routine determines the logic state of the data bit by analyzing the status of the pulse-received flag. If the state of the pulse-received flag is a logic one, a logic one is entered into the least significant bit location of an eight-bit shift register, hereafter called the data-accumulation register. If the state of the pulse-received flag is a logic zero, then a logic zero is entered in the data-accumulation register. Thereafter, the system reduces the contents of the bit counter, and continues to recover subsequent bits until the eight bits of the data byte have been recovered. The register, counter and timer referred to in this paragraph are internal to microprocessor 10.

The system then copies the contents of the data-accumulation register into the memory address located by the index register, adds the arithmetic value of the data byte to the previous value of the check sum register, resets the bit counter to count the number of bits for the next byte, and changes the contents of the index register to locate the destination address in memory for the next data byte to be recovered by one, as represented by said byte counter. If there are more bytes to be recovered, the system then returns to the synchronize routine, and repeats the foregoing recovery sequence until all data bytes, here nine, have been recovered.

Thereafter, the system compares the arithmetic value of the recorded check sum, here the last data byte recovered, with the value of the check sum accumulated during the recover sequence. If the values are exactly the same, the system sets the valid data flag and exits the data recover routine. If any difference is detected between the values, the system repeats the recover copy routine, reading subsequent duplicate copies, until the valid data flag is set or until the end of data location is reached on said tape. Thereafter, the system stops the recover data routines. In preferred embodiment, the valid data flag is used to determine if full operation is to be restored to the answering system. If the valid data flag is not set, full operation is not enabled since malfunctions could occur.

FIG. 1 also shows other conventional parts of a telephone answering system. The term "KEYBOARD AND SWITCH", which is made up of keys and/or switches used to command the telephone answering system to perform various functions such as announcement record, announcement check, number record, message/memo playback, stop, and on/off.

The term "DTMF DETECT" refers to a circuit used in remote access telephone answering systems to detect dual tone multi-frequency signals. When present on the telephone line, these signals command the system to perform various functions such as message playback, message repeat, message cancel, announce record/check, and on/off.

The term "POWER SUPPLY" refers to a circuit used to regulate and supply electrical power to all elements of the system.

The term "RING DET." refers to a circuit used in telephone answering systems to detect ring signals, when present on the telephone line, to command the system to seize a telephone line, transmit an outgoing announcement, and record an incoming message.

The term "TEL LINE I/O" refers to the input-output interface circuit between a telephone line and a telephone answering system through which outgoing announcements are transmitted to the line, and incoming messages are received.

The term "MIC." refers to a microphone used in telephone answering systems to detect voice signals which are recorded as a memo or as an outgoing announcement.

The term "SPK.AMP." refers to a speaker amplifier which is an amplifier circuit comonly used to amplify audio signals sufficiently to drive a loud speaker.

The term "SPK." refers to a loudspeaker used to review recorded annuncements and messages.

The term "MOTION DETECT" refers to a circuit in a telephone answering system used to convert signals generated by a motion sensor into logic level signals which are used by a microprocessor to determine if the tape is moving through the tape deck and to locate various locations on the tape, such as the beginning of announcement, the end of announcement, the beginning of messages, the end of messages, and the end of the tape.

The term "MOTION" refers to a motion sensor such as a magnetic or optical device used to sense movement of the tape in the tape deck.

What is claimed is:

1. In a telephone answering system including at least one storage means for recording an announcement, a system for generating, recording and recovering operational information stored in memory means in said answering system in the form of data, said data being recoverable upon resumption of power following power interruption to said telephone answering system, said data generating, data recording and data recovering system including: means for recording said data on said storage means in the form of binary-encoded audio signals, said recording means including means for encoding each bit of said data in the form of a synchronizing pulse of predetermined length followed by a period of predetermined time length for recording a pulse if said bit represents a first logic state and for recording nothing if said bit represents a second logic state; means for updating the recorded data whenever said operational data in said answering system memory changes; and means for recovering the recorded data following interruption of power to said answering system and subsequent resumption of power to said system.

2. The system of claim 1 further comprising means for recording a plurality of duplicate copies of said operational data and means for recovering at least one of said duplicate copies upon said resumption of power to said answering system.

3. The system of claim 1 wherein the recording means includes means for recording a check sum representing the total of all the recorded data for use in verifying and validating complete recovery of data during operation of said recovering means.

4. In a telephone answering system including at least one storage means for recording an announcement, and at least one storage means for recording an incoming calls to said answering system, a system for generating, recording and recovering operational data stored in memory means in said answering system, said data being recoverable upon resumption of power following power interruption to said answering system, said data generating, data recording and data recovering system including: means for recording said data on said storage means, said recording means including means for encoding each bit of said data in the form of a synchronizing pulse of predetermined length followed by a period of predetermined time length for recording a pulse if said bit represents a first logic state and for recording nothing if said bit represents a second logic state; means for updating recorded data whenever said operational data in said answering system memory changes; and means for recovering the recorded data following interruption of power to said answering system and subsequent resumption of power to said system.

5. The system of claim 4 further comprising means for recording a plurality of duplicate copies of said operational data and means for recovering at least one of said duplicate copies upon said resumption of power to said answering system.

6. The system of claim 4 wherein the recording means includes means for recording a check sum representing the total of all the recorded data for use in verifying and validating complete recovery of data during operation of said recovering means.

7. In a telephone answering system including at least one storage means for recording an announcement and for receiving incoming telephone calls to said answering system, a system for generating, recording and recovering operational information stored in said answering system in the form of data, said data being recoverable upon resumption of power following power interruption to said answering system, said data generating, data recording and data recovering system including: means for recording said data on said storage means recovering system including: means for recording said data on said storage means, said recording means including means for encoding each bit of said data in the form of a synchronizing pulse of predetermined length followed by a period of predetermined time length for recording a pulse if said bit represents a first logic state and for recording nothing if said bit represents a second logic state; means for updating recorded data whenever said operational data in said answering system memory changes; and means for recovering the recorded data following interruption of power to said answering system and subsequent resumption of power to said system.

8. The system of claim 7 further comprising means for recording a plurality of duplicate copies of said operational data and means for recovering at least one of said duplicate copies upon said resumption of power to said answering system.

9. The system of claim 7 wherein the recording means includes means for recording a check sum representing the total of all the recorded data for use in verifying and validating complete recovery of data during operation of said recovering means.

10. In a telephone answering system including at least one storage means for recording an announcement, a system for generating, recording, and recovering operational information stored in memory means in said answering system in the form of data, said data being recoverable upon resumption of power following power interruption to said telephone answering system, said data generating, data recording and data recovering including:
- means for recording said data on said storage means in the form of binary-encoded audio signals, said recording means including means for recording a check sum representing the total of all recorded data for use in verifying and validating complete recovery of data during operation of said answering system;
- means for updating the recorded data whenever said operational data in said answering system changes; and
- means for recovering the recorded data following interruption of power to said answering system and subsequent resumption of power to said system.

11. A telephone answering system including at least one storage means for recording an announcement, and at least one storage means for recording an announcement, and at least one storage means for recording incoming calls to said answering system, a system for generating, recording and recovering operational data stored in memory means of said answering system, said data being recoverable upon resumption of power following power interruption to said answering system, said data generating, data recording and data recovering system including:
- means for recording said data on said incoming calls storage means, said recording means including means for recording a check sum representing the total of all the recorded data for use in verifying and validating complete recovery of data during operation of said answering system;
- means for updating recorded data whenever said operational data in said answering system memory means changes; and
- means for recovering the recorded data following interruption of power to said answering system and subsequent resumption of power to said system.

12. In a telephone answering system including at least one storage means for recording an announcement and for receiving incoming telephone calls to said answering system, a system for generating, recording and recovering operational information stored in memory means in said answering system in the form of data, said data being recoverable upon resumption of power following power interruption to said answering system, said data generating, data recording and data recovering system including:
- means for recording said data on said storage means, said recording means including means for recording a check sum representing the total of all the recorded data for use in verifying and validating complete recovery of data during operation of said answering system;
- means for updating recorded data whenever said operational data in said answering system memory means changes; and
- means for recovering the recorded data following interruption of power to said answering system and subsequent resumption of power to said system.

* * * * *